United States Patent [19]
Naito

[11] Patent Number: 5,101,098
[45] Date of Patent: Mar. 31, 1992

[54] PREPAID CARD PROCESSING DEVICE

[75] Inventor: Yoshinobu Naito, Toyoake, Japan

[73] Assignee: Brother Kogyo Kabushiki Kaisha, Aichi, Japan

[21] Appl. No.: 524,726

[22] Filed: May 17, 1990

[30] Foreign Application Priority Data

Jul. 10, 1989 [JP] Japan .................................. 1-178531

[51] Int. Cl.$^5$ ............................................. G06K 13/00
[52] U.S. Cl. .................................. 235/475; 235/379; 235/380; 235/382
[58] Field of Search ............... 364/408; 235/379, 380, 235/382, 432, 475; 902/36

[56] References Cited

U.S. PATENT DOCUMENTS 4,641,239 2/1987 Takasako .......................... 235/379
4,877,947 10/1989 Mori .................................... 235/381

Primary Examiner—Harold Pitts
Attorney, Agent, or Firm—Oliff & Berridge

[57] ABSTRACT

A prepaid card processing device processes a prepaid card provided with a memory for storing information related to an account and a printing portion on which monetary information is to be printed. The prepaid card processing device comprises a reading/writing portion for reading the information stored in the memory and for writing information into the memory. A recording portion records monetary information on a receipt and a recording control portion carries the prepaid card to the recording portion so that the monetary information can be printed on the printing portion of the card. A single recording portion thus records monetary information on both the receipt and the printing portion of the prepaid card.

17 Claims, 3 Drawing Sheets

PREPAID CARD PROCESSING DEVICE

BACKGROUND OF THE INVENTION

1. Field of the Invention

The invention relates to a prepaid card processing device and particularly to a recording device disposed in a prepaid card processing device.

2. Description of Related Art

In recent years, more and more prepaid cards are used at ordinary retail stores. Therefore, prepaid card processing devices have been installed at such retail stores to process prepaid cards. At the same time, however, cash registers are still needed at the retail stores for handling cash transactions.

In general, a cash register consists of a key input unit for entering amounts of money, a sheet recording unit for printing amounts of money entered via the key input unit on receipts to be given to customers, a drawer unit for keeping cash and a recording control unit for controlling the recording unit, which prints data entered via the key input unit on the receipts.

A recent prepaid card processing device is typically composed of a reading/writing portion to read or write information on amounts of money from or to prepaid cards and a control portion to change the read information when the customer makes payment on purchases. In addition, it also includes a card recording portion to record the remaining amount of money in an account corresponding to the card on the printing surface of the prepaid card to be printed after the payment, and a recording control portion to control the card recording portion.

A cash register installed at such a retail store is equipped with a sheet recording device to record details of payment on receipts while a prepaid card processing device is provided with a card recording device to record an account balance on the card.

As such, a cash register and a prepaid card processing device have to be individually manufactured, purchased and installed at a retail store. Installing two recording devices having similar functions is a waste of space and a retail store's limited space should be utilized efficiently. The waste of space and need to purchase two separate machines results in rising costs to run the retail store.

SUMMARY OF THE INVENTION

In order to solve the above-mentioned problems in the prior art, the object of the invention is to provide a card, e.g., prepaid card, processing device which is, by using a single recording unit, relatively inexpensive to manufacture and capable of recording data onto both a piece of paper as a receipt and a prepaid card so as to reduce operating costs and conserve space of a retail store.

In order to attain the above object, a card processing device which processes a card provided with a recording portion on which information is to be recorded comprises: a recording means to record account and/or transaction information on a recording sheet; and a recording control means to convey the card to the recording means and record account and/or transaction information on the recording portion of the card via the recording means.

Functionally, the recording control means controls the recording means which, in turn, records the information, e.g., an amount of money, onto both the card and the recording sheet.

BRIEF DESCRIPTION OF THE DRAWINGS

The objectives, features and advantages of the invention will become more apparent from the following description of a preferred embodiment of a card processing device and accompanying drawings, wherein.

DETAILED DESCRIPTION OF THE PREFERRED EMBODIMENT

Figure 2:
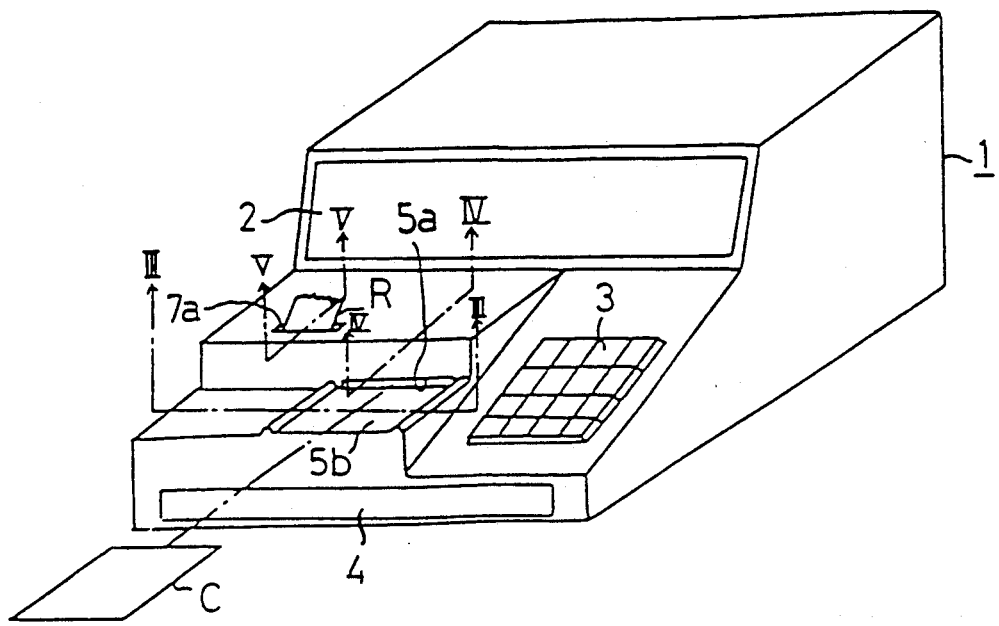
FIG. 2 shows the overall external view of a prepaid card processing device.

As shown in FIG. 2, a prepaid card processing device 1 is provided with a function of a cash register, having a display unit 2 to display amounts of money representing sales. The display unit 2 is attached at the upper front portion of the prepaid card processing unit 1. An input unit 3 which consists of a variety of input keys including ten numeric keys is attached at the right lower portion of the front part of the prepaid card processing device 1. The ten keys are normally used to enter sales charges. A storing window 4 of a cashbox which is used to keep cash is located at the lower portion of the prepaid card processing device 1.

A card inlet/outlet port 5a through which a prepaid card C is inserted into the prepaid card processing device 1 is installed at the left portion of the input unit 3 located on the front part of the prepaid card processing device 1. A card inlet/outlet base 5b on which the prepaid card C is placed is attached in front of the card inlet/outlet port 5a. A card feeder means 5 which is joined to the card inlet/outlet port 5a is provided inside the prepaid card processing device 1.

Figure 4:
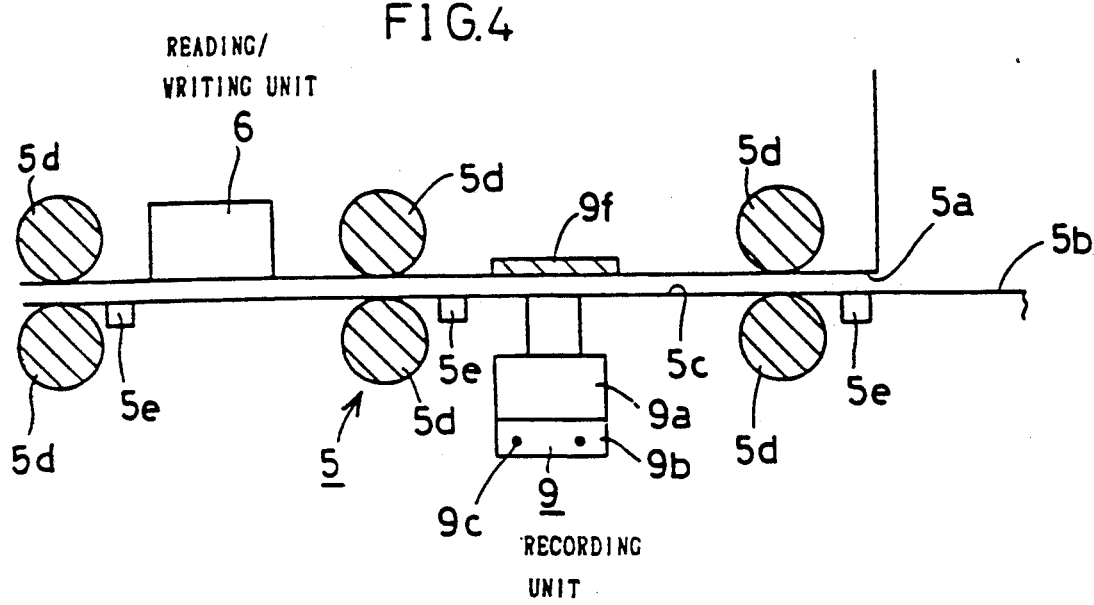
FIG. 4 shows an enlarged fragmentary sectional view taken on line IV—IV of FIG. 2.

As shown in FIG. 4, the card feeder means (hereinafter card feeder) 5 is equipped with a conveying guide 5c along which the prepaid card C moves and three pairs of feed rollers 5d installed along the conveying guide 5c for moving the prepaid card C through the conveying guide 5c. The card feeder 5 is also provided with a number of sensors 5e which are installed along the conveying guide 5c to detect the prepaid card C moving through the conveying guide 5c.

When the prepaid card C is placed on the card inlet/outlet base 5b and is inserted into the card inlet/outlet port 5a, e.g., by a shop-person in a retail store, the sensors 5e in the prepaid card processing device 1 detect the prepaid card C to cause the feed rollers 5d to rotate and carry the prepaid card C along the conveying guide 5c into the prepaid card processing device 1.

A recording unit means (hereinafter recording unit) 9 is installed on the conveying guide 5c between the feed rollers 5d closest to the card inlet/outlet port 5a and the inner feed rollers 5d adjacent to the just mentioned feed rollers 5d. The recording unit 9 is used to record, e.g., print, information on amounts of money in an account onto the printing portion of the prepaid card C to be printed.

A reading/writing unit 6 is installed on the conveying guide 5c between the above-mentioned inner feed rollers 5d and the innermost feed rollers 5d in the prepaid card processing device 1. The reading/writing unit 6 is used to read and write the information on amounts of money from and to a magnetic recording portion of the prepaid card C, that is, a magnetic tape embedded in the prepaid card C.

This reading/writing unit 6 reads the information from the magnetic recording portion of the prepaid card C and then transmits the information to a control unit 8 which will be described later. In addition, the reading/writing unit 6 stores information received from the control unit 8.

Figure 5:
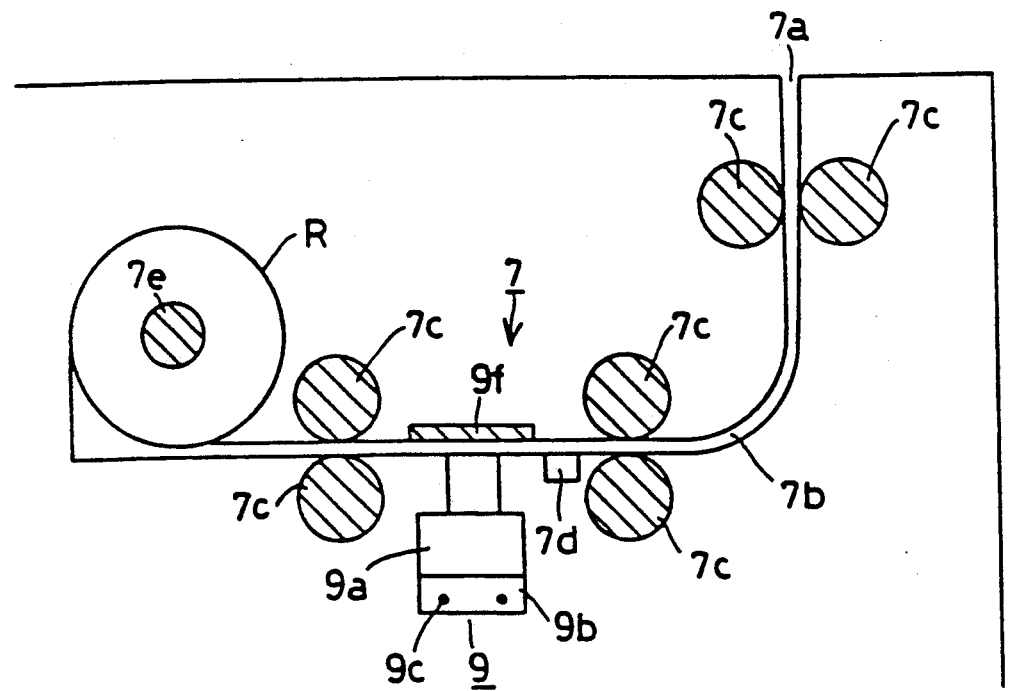
FIG. 5 is an enlarged fragmentary sectional view taken on line V—V of FIG. 2.

Referring to FIG. 5, an outlet 7a for paper R is installed in close proximity to the card inlet/outlet port 5a at the front part of the prepaid card processing device 1. A paper feeder means (hereinafter paper feeder) 7 joined to the outlet 7a is installed inside the prepaid card processing device 1.

Figure 3:
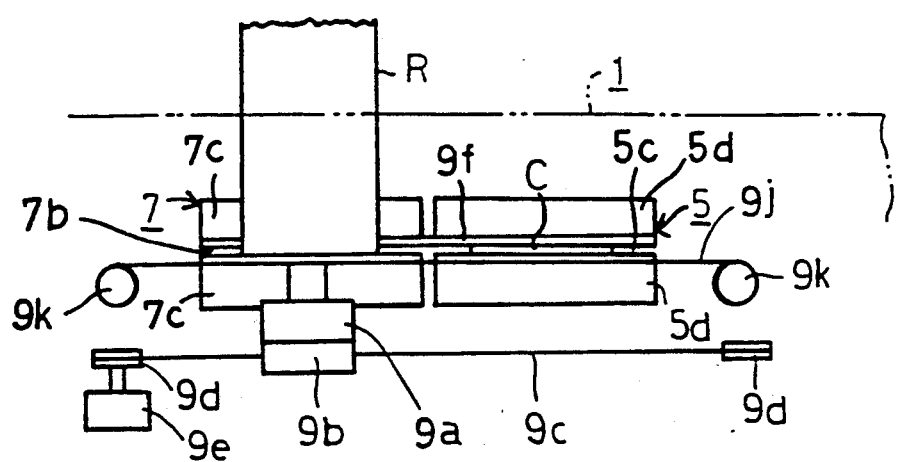
FIG. 3 is an enlarged fragmentary sectional view taken on line III—III of FIG. 2.

As shown in FIG. 5, the paper feeder 7 is provided with an L-shaped conveying path 7b through which the paper R moves and three pairs of feed rollers 7c installed along the conveying path 7b for conveying the paper R forward along the conveying path 7b. The paper feeder 7 is also equipped with a sensor 7d which is installed on the conveying path 7b to detect the paper R moving forward along the conveying path 7b. A paper holder 7e is installed at the innermost end of the conveying path 7b to hold a roll of unused paper R. The paper holder 7e rotates the roll of the paper R so as to feed the end of the paper R into the conveying path 7b. As shown in FIG. 3, the conveying path 7b is located in parallel and in close proximity to the conveying guide 5c described previously.

The recording unit 9 described previously is disposed on the conveying path 7b between the innermost feed rollers 7c and the feed rollers 7c closest to the innermost feed rollers 7c.

The recording unit 9 has a recording head 9a, a carriage 9b, a wire 9c, a pair of pulleys 9d, a motor 9e, a platen 9f, an ink ribbon 9j, and a pair of ink ribbon pulleys 9k of the type commonly used in a register of a typewriter. The recording head 9a writes information onto the paper R and the prepaid card C described previously. The carriage 9b retains the recording head 9a to carry the recording head 9a in the direction perpendicular to the conveying guide 5c and the conveying path 7b.

The pair of pulleys 9d are composed of the left pulley 9d which is installed at the left side of the conveying path 7b and the right pulley 9d which is installed at the right side of the conveying guide 5c as shown in FIG. 3. The pair of pulleys 9d pull the wire 9c which is, in turn, tied to the carriage 9b and used to drag the carriage 9b into movement. The motor 9e which drives the pair of pulleys 9d is connected to the left pulley 9d. The platen 9f which is installed in the front of the recording head 9a holds the prepaid card C and the paper R against the recording head 9a. The ink ribbon 9j which is supported by a pair of ink ribbon pulleys 9k which will be described later is installed between the recording head 9a and the platen 9f.

The platen 9f fixed on the upper side of the conveying guide 5c and the conveying path 7b has a length exceeding the range through which the recording head 9a moves back and forth. The assembly consisting of the recording head 9a and the carriage 9b is positioned on the lower side of the conveying guide 5c and the conveying path 7b. The motor 9e drives the pair of pulleys 9d which rotate, pulling the wire 9c. The wire 9c moves the recording head 9a and the carriage 9b.

The pair of ink ribbon pulleys 9k is composed of a left side pulley 9k which is installed at the left side of the conveying path 7b and a right side pulley 9k which is installed at the right side of the conveying guide 5c as shown in FIG. 3. The right side pulley 9k is connected to a motor (not shown).

The ink ribbon 9j is wound around and is kept taut by the pair of pulleys 9k moved by the ribbon feed motor, which may be the same as that commonly used in printers, after the recording head 9a prints a certain amount of information.

Controlled by the control unit 8, the recording head 9a writes the information at specific positions on the paper R and the prepaid card C via the ink ribbon 9j. The recording head 9a is of the conventional wire dot type commonly used in printers.

The control unit 8 drives the paper feeder 7 to feed the paper R and to halt it at a certain position. The control unit 8 then moves the recording head 9a across the paper R together with the carriage 9b and controls the printing of the information onto the paper R by the recording head 9a. The control unit 8 also drives the card feeder 5 to carry the prepaid card and to halt it at a certain position. The control unit 8 then moves the recording head 9a across the prepaid card C together with the carriage 9b and controls the printing of the information onto the prepaid card C by the recording head 9a.

When the recording head 9a is about to print the information along a next line on the paper R, the control unit 8 drives the ribbon feed motor, to feed the ink ribbon 9j by a certain length and to halt it at a certain position. At the same time, the control unit 8 also drives the paper feeder 7 to feed the paper R by a line and to halt it at a certain position. After the ink ribbon 9j and the paper R comes to a complete halt, the control unit 8 controls the printing of the information by the recording head 9a onto the paper R through the ink ribbon 9j.

When the recording head 9a is about to print the information along the next line on the prepaid card C, the control unit 8 drives the ribbon feed motor to feed the ink ribbon 9j by a certain length and to halt it at a certain position. At the same time, the control unit 8 also drives the card feeder 7 to feed the prepaid card C by a line and to halt it at a certain position. After the ink ribbon 9j and the prepaid card C come to a complete halt, the control unit 8 controls the printing of the information by the recording head 9a onto the prepaid card C through the ink ribbon 9j.

Figure 1:
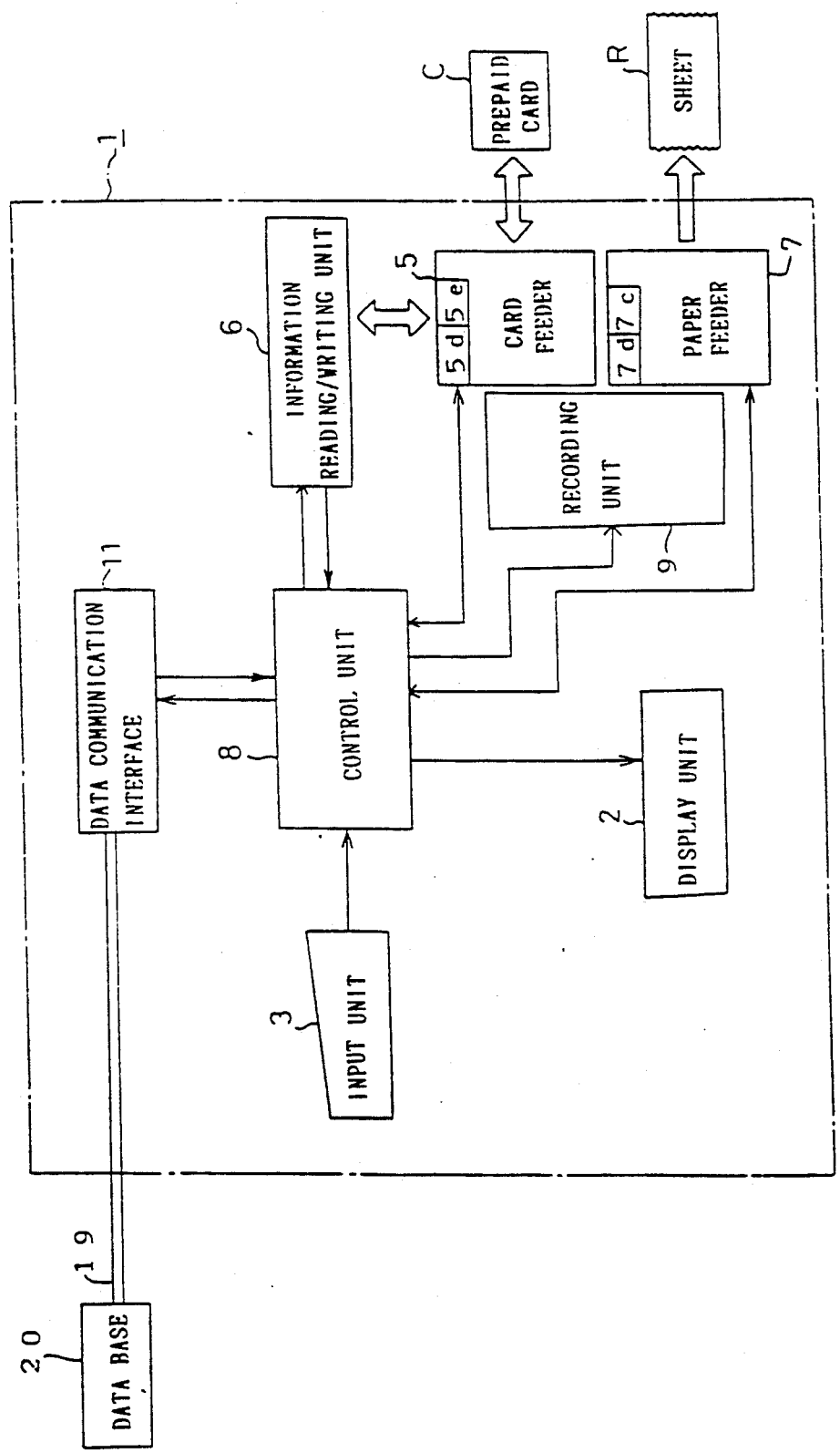
FIG. 1 is a block diagram showing the electrical configuration of a prepaid card processing device.

As shown in FIG. 1, the prepaid card processing device 1 is controlled by the control unit 8 which is composed of a Central Processing Unit (CPU), a Read Only Memory (ROM) and a Random Access Memory (RAM). The RAM is used as a work area whereas the ROM is used to store a variety of processing programs for handling, among other things, sales data and other programs for controlling a variety of equipment provided in the prepaid card processing device 1. The CPU operates in accordance with the programs stored in the ROM and the data stored in the RAM.

Inside the prepaid card processing device 1, the outputs of the control unit 8 are electrically connected to the display unit 2, the card feeder 5 constituting a first carrying means, the paper feeder 7 constituting a second carrying means, the sensors 5e, the sensor 7d and a printer 9. On the other hand, the inputs of the control unit 8 are electrically connected to the input unit 3. As shown in FIG. 1, the data communication interface 11 is installed inside the prepaid card processing device 1. The control unit 8 is also electrically connected to the information reading/writing unit 6 and the data communication interface 11 so as to allow the information to be exchanged among the control unit 8, the information reading/writing unit 6 and the data communication interface 11. The data communication interface 11 allows information on customers to be exchanged via a communication line 19 between the control unit 8 and a data base 20 which is used to store the information on customers, including mainly the balances remaining in accounts corresponding to registered cards C.

Next, the operation of the prepaid card processing device 1 having the configuration described so far will now be explained.

A shop-person who operates the prepaid card processing device 1 places the customer's prepaid card C on the card inlet/outlet base 5b, inserting the prepaid card C into the card feeder 5 through the card inlet/output port 5a. As the sensor 5e detects the prepaid card C being inserted into the card feeder 5, the control unit 8 rotates the feed rollers 5d in order to further take in the prepaid card C, conveying the prepaid card C to the information reading/writing unit 6. The information reading/writing unit 6 reads registration number information of the prepaid card C from a magnetic tape of the prepaid card C which serves as a memory and transmits it to the control unit 8 which makes an access based on the registration number of the prepaid card C to the data base 20 via the data communication interface 11 and reads information on the customer's account balance corresponding to the registration number from the data base 20.

As the shop-person enters the price of a commodity purchased by the customer by operating the input keys of the input unit 3, the control unit 8 adds the price to the total, computing the amount of payment to be paid by the customer. In addition, the control unit 8 subtracts the amount of payment from the balance of the prepaid card C which was read previously from the data base 20 to give an updated new balance. The control unit 8 then makes an access based on the registration number of the prepaid card C to the data base 20 through the data communication interface 11 in order to update the balance for the customer with the new value.

Afterward, the control unit 8 gives a command to the paper feeder 7 to feed the paper R and to halt the paper R at a specific position. Subsequently, the control unit 8 drives the printer 9 to move a printing head 92 back and forth across the entire width of the paper R, printing the prices of commodities purchased by the customer, the total payment to be made and the date of transaction on the paper R. The control unit 8 then rotates the feed rollers 7b which, in turn, send a printed receipt to the paper outlet 7a.

After the operations to print data on the paper R and to output the receipt to the paper outlet 7a have been completed, the control unit 8 drives the card feeder 5 which, in turn, rotates the feed rollers 5d, conveying the prepaid card C from the information reading/writing unit 6 in the conveying guides direction toward the card inlet/outlet port 5a. At that time, the control unit 8 receives feedback signals from the sensors 5e which are used to feed and halt the prepaid card C at a specific position. Subsequently, the control unit 8 moves the recording head 9a back and forth across the entire width of the prepaid card C, writing the new balance for the prepaid card C on a printing portion of the prepaid card C. The control unit finally rotates the feed rollers 5d which, in turn, convey the prepaid card C from the card inlet/outlet port 5a to the card inlet/outlet base 5b. The processing of the transaction for the customer is then completed.

As is apparent from the above description, by installing the card feeder 5 in parallel with the paper feeder 7 so that the prepaid card C is taken in and out in the same direction that the paper R is fed, the printer 9 can be built in the prepaid card processing device 1 in such a way that the recording head 9a moves back and forth across the entire width of the prepaid card C and the paper R. As a result, by using a single recording unit 9, the information can be efficiently printed onto both the prepaid card C and the paper R. Additionally, the prepaid card processing device 1 can be made more compact than conventional devices, thus reducing store operating costs and creating additional space. Furthermore, the prepaid card processing device can be manufactured inexpensively relative to devices providing separate means for printing on the card C and paper R.

As another embodiment, a line type recording head having the same length as the entire length of the prepaid card or a piece of paper may be adopted instead of the serial recording head which moves back and forth.

Another embodiment may adopt a daisy wheel or ball-type recording head instead of a dot type recording head.

The invention may also be embodied by disposing the printing portion of the prepaid card o the back surface instead of the front surface.

It should be noted that the invention is not limited only to the embodiment described so far, but can also be applied to an embodiment in which the new balance is memorized in the prepaid card as magnetic information before the prepaid card is carried out from the prepaid card processing device, or to an embodiment which prints the amount of payment on the prepaid card.

As many apparently widely different embodiments of this invention may be made without departing from the spirit and scope thereof, it is to be understood that the invention is not limited to the specific embodiments thereof except as defined in the appended claims.

What is claimed is:

1. A card processing device for processing a card provided with a recording portion on which information is to be recorded, said card processing device comprising:
   a card feeder means establishing a card feed path;
   a paper feeding means having a paper feed path positioned alongside and parallel to said card feed path;
   recording unit means for printing at least one of account and transaction information on the card introduced into said card feeder means and on a paper fed by said paper feeding means; and
   recording control means for conveying the card and the paper to said recording unit means and for initiating printing of the at least one of the account and transaction information on each of the recording portion of the card and the paper, wherein said recording unit means is a serial printer having a single print head capable of traversing a width of both the card and the paper for printing.

2. A card processing device for processing a card provided with a memory for storing information relating to an account and a recording portion on which information is to be recorded, said card processing device comprising:
- a card feeder means;
- a paper feeding means alongside said feeder means;
- reading means for reading the information stored in said memory;
- recording unit means for printing at least one of account and transaction information on the card introduced into said card feeder means and on a paper fed by said paper feeding means; and
- recording control means for conveying the card and the paper to said recording unit means and for initiating printing of the at least one of the account and transaction information on each of the recording portion of the card and the paper, wherein said recording unit means is a serial printer having a single print head capable of traversing a width of both the card and the paper for printing.

3. A card processing device according to claim 2, wherein the information stored in said memory includes registration data for identifying an account and said reading means reads the registration data and forwards the registration data to said recording control means.

4. A card processing device according to claim 3, wherein said recording control means makes an access, based on said registration data, to a data base through a data communication interface, and reads a balance from the data base for the account corresponding to the registration data.

5. A card processing device according to claim 4, wherein said recording control means subtracts a charge amount for a transaction from said balance to give a new balance and makes an access, based on the registration data, to the data base through the data communication interface to update the balance for said account with the new balance.

6. A card processing device according to claim 2, further comprising data input means operatively connected to said recording control means for inputting charges against said account, wherein each time a charge is entered via the input means, said recording control means adds the charge to a previous charge amount to give a new total charge.

7. A card processing device according to claim 2, wherein the information recorded on said prepaid card is account balance information and the information recorded on the paper is transaction information.

8. A card processing device according to claim 2, further comprising a roll-type paper feeder for feeding the paper to said recording unit means.

9. A card processing device according to claim 2, further comprising writing means for writing account balance information with said memory.

10. A card processing device for processing a card provided with a memory for storing information relating to an account and a recording portion on which information is to be recorded, said card processing device comprising:
- reading means for reading the information stored in said memory;
- first conveying means for conveying said card to said reading means along a first direction;
- recording means for recording at least one of account and transaction information on a recording sheet and said recording portion of the card;
- second conveying means for conveying the recording sheet toward said recording means along a feed path substantially parallel to and alongside the first direction of said first conveying means;
- third conveying means for conveying said recording means substantially perpendicularly to the first direction of said conveying means and the feed path of the recording sheet so that said recording means may transverse the entire width of the first conveying means and the feed path of the recording sheet; and
- control means for controlling said recording means to record the at least one of the account and transaction information on the recording sheet and on said recording portion of said card.

11. A card processing device according to claim 10, wherein said third conveying means is provided with a carriage for carrying said recording means.

12. A card processing device according to claim 10, wherein after said reading means reads the information from said memory of said card, said card is conveyed further in said first direction by said first conveying means to a position where said recording means subsequently records the at least one of the account and transaction information onto said card as said recording means is conveyed by said third conveying means.

13. A card processing device according to claim 10, wherein said first conveying means is provided with a plurality of feed rollers along a conveying guide for carrying said card through said conveying guide.

14. A card processing device according to claim 10, wherein said second conveying means is provided with a plurality of feed rollers along a conveying path for carrying the recording sheet through said conveying path.

15. A card processing device as claimed in claim 1, further comprising a paper outlet for dispensing the paper with the at least one of the account and transaction data printed thereon.

16. A card processing device according to claim 2, further comprising a paper outlet for dispensing the paper with the at least one of the account and transaction data printed thereon.

17. A card processing device according to claim 10, further comprising a paper outlet for dispensing the paper with the at least one of the account and transaction data printed thereon.

* * * * *